(12) United States Patent
Lee

(10) Patent No.: US 6,590,887 B1
(45) Date of Patent: Jul. 8, 2003

(54) METHOD FOR TRANSMITTING SHORT MESSAGE IN DIGITAL MOBILE COMMUNICATION TERMINAL WITH SHORT MESSAGE SERVICE FUNCTION

(75) Inventor: Hye-Young Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/143,478

(22) Filed: Aug. 28, 1998

(30) Foreign Application Priority Data

Aug. 28, 1997 (KR) .......................................... 97-41867

(51) Int. Cl.7 ............................................. H04B 7/216
(52) U.S. Cl. ....................................... 370/342; 370/441
(58) Field of Search ................................. 370/335, 342, 370/320, 441; 455/466

(56) References Cited

U.S. PATENT DOCUMENTS 5,668,880 A * 9/1997 Alajajian ..................... 380/49
5,692,032 A * 11/1997 Seppanen et al. ............. 379/59
5,943,399 A * 8/1999 Bannister et al. ......... 379/88.17
6,097,961 A * 8/2000 Alanara et al. ............. 455/466
6,301,338 B1 * 10/2001 Makela et al. ........... 379/88.21

* cited by examiner

Primary Examiner—Alpus H. Hsu
Assistant Examiner—Toan Nguyen
(74) Attorney, Agent, or Firm—Dilworth & Barrese, LLP

(57) ABSTRACT

A digital mobile communication terminal with a SMS (Short Message Service) function stores user predefined messages which are frequently used and transmits a short message by using the user predefined messages. The communication terminal determines whether a short message transmission mode is set through a user interface and determines whether a user predefined message using mode is set, if the short message transmission mode is set. The user predefined messages are read in sequence from the memory and displayed on a display, if the user predefined message using mode is set. Subsequently, a selected one of the user predefined messages is displayed and edited according to edit data or input data received from the user interface. After editing the short message, the communication terminal transmits the edited short message to a designated telephone number.

9 Claims, 3 Drawing Sheets

METHOD FOR TRANSMITTING SHORT MESSAGE IN DIGITAL MOBILE COMMUNICATION TERMINAL WITH SHORT MESSAGE SERVICE FUNCTION

BACKGROUND OF THE INVENTION

1. Field of the Invention

The present invention relates to a short message service function of a mobile communication terminal such as a CDMA (Code Division Multiple Access) or PCS (Personal Communication Services) terminal, and in particular, to a method for transmitting a short message using user predefined messages.

2. Description of the Related Art

In a conventional digital mobile communication terminal with a short message service (SMS) function, a user of the terminal inputs a short message every time he or she transmits the short message. Usually, the digital mobile communication terminal does not have character keys for exclusive use of the SMS function, thus requiring the user to press numeric keys several times to input a specific character message.

Accordingly, the user must manipulate the keys several times to transmit even a short message, which is annoying and wastes time. As a result of this inconvenience, the user may avoid using the SMS function.

SUMMARY OF THE INVENTION

It is therefore an object of the present invention to provide a method for use in a digital mobile communication terminal with an SMS function for storing user predefined messages which are frequently used and transmitting a short message by using the user predefined messages.

To achieve the above object, the present invention provides a method for transmitting a short message in a digital mobile communication terminal having a memory in which user predefined messages are stored. The communication terminal determines whether a short message transmission mode is set through a user interface and if the short message transmission mode is set, the terminal then determines whether a user predefined message using mode is set. If the user predefined message using mode is set, the user predefined messages are then read from the memory and displayed on a display. Subsequently, a selected one of the user predefined messages is displayed and edited according to edit data or input data received from the user interface. After the short message is edited, the communication terminal transmits the edited short message to a designated telephone number.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENT

Preferred embodiments of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

It is to be noted that the present invention is applicable to a digital mobile communication terminal with an SMS function. A Cellular Paging Teleservice (CPT) function mentioned below, corresponding to a PCS Paging Teleservice (PPT) function of the PCS terminal, is an SMS function of a CDMA terminal for transmitting the telephone numbers of the called party and the calling party. A Cellular Message Teleservice (CMT) function corresponding to a PCS message Teleservice (PMT) function of the PCS terminal is an SMS function of the CDMA terminal for transmitting a short user message. These SMS functions are specified in detail in the IS-637 and IS-95A Standards. Thus, the description thereof will be omitted herein.

Figure 1:
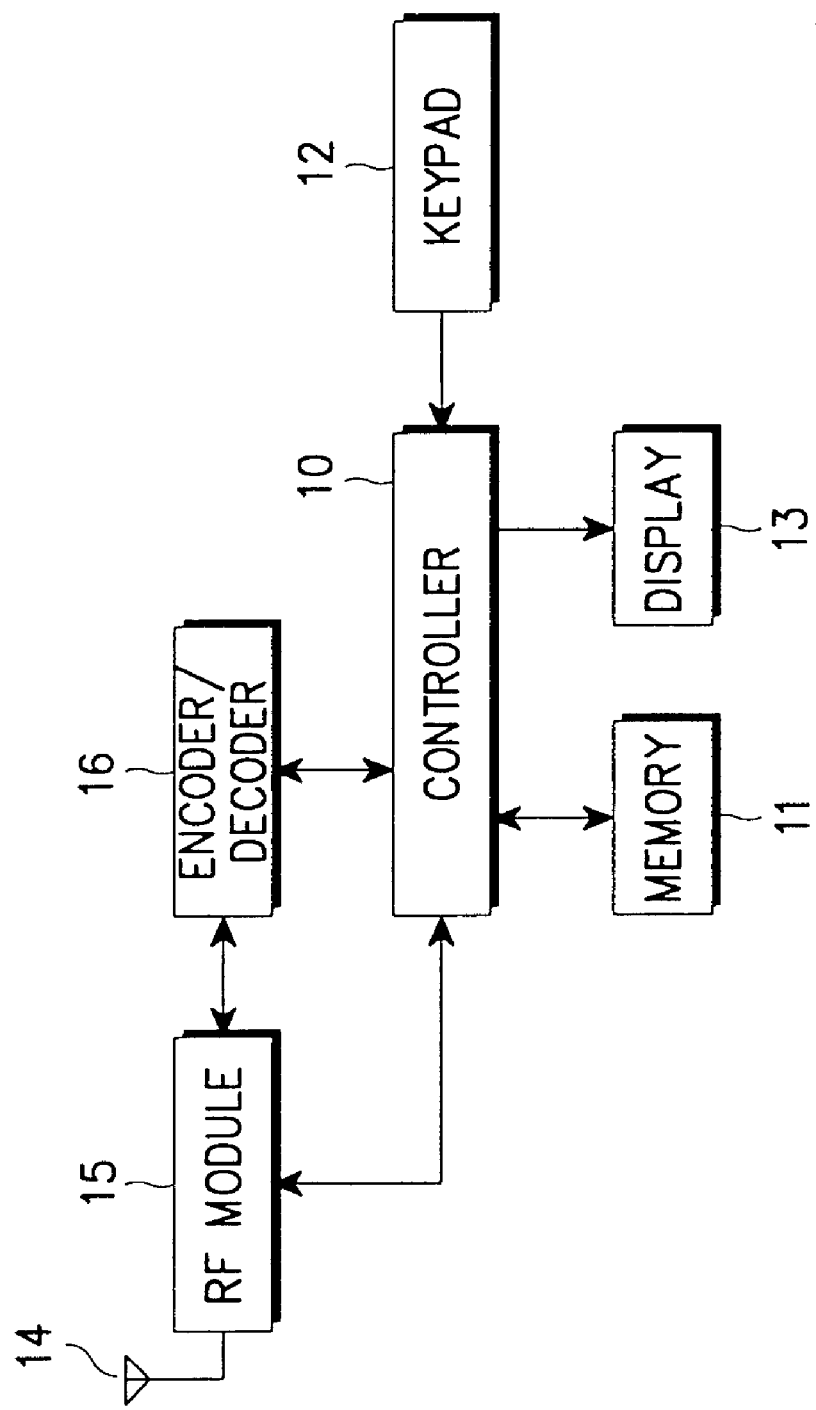
FIG. 1 is a block diagram of a digital mobile communication terminal applied to the present invention.

FIG. 1 shows a block diagram of a digital mobile communication terminal which is suitable for use with the present invention. Referring to FIG. 1, a controller 10 controls the overall operation of the communication terminal. A memory 11 consists of a ROM (Read Only Memory) for storing an operation program according to the present invention, a RAM (Random Access Memory) for temporarily storing data generated during execution of the operation program and an EEPROM (Electrically Erasable and Programmable ROM) for storing the user predefined messages according to the present invention. An RF (Radio Frequency) module 15 demodulates an RF signal received from an antenna 14 and outputs the modulated RF signal to an encoder/decoder 16. Further, the RF module 15 modulates a signal input from the encoder/decoder 16, converts the modulated signal to an RF signal and radiates the RF signal through the antenna 14.

The encoder/decoder 16, which is generally a chip specifically designed for use in a CDMA or PCS terminal, encodes the signal generated by the CDMA or PCS terminal under the control of the controller 10 and outputs the encoded signal to the RF module 15. In addition, the encoder/decoder 16 decodes the signal input from the RF module 15 by the CDMA or PCS terminal and outputs the decoded signal to the controller 10. A keypad 12, is a user interface which includes a number of numeric keys for dialing and function keys for performing various functions. The keypad 12 generates key data to the controller 10 upon key manipulation by the user. A display 13, preferably an LCD (Liquid Crystal Display), displays display data under the control of the controller 10.

Figure 2A:
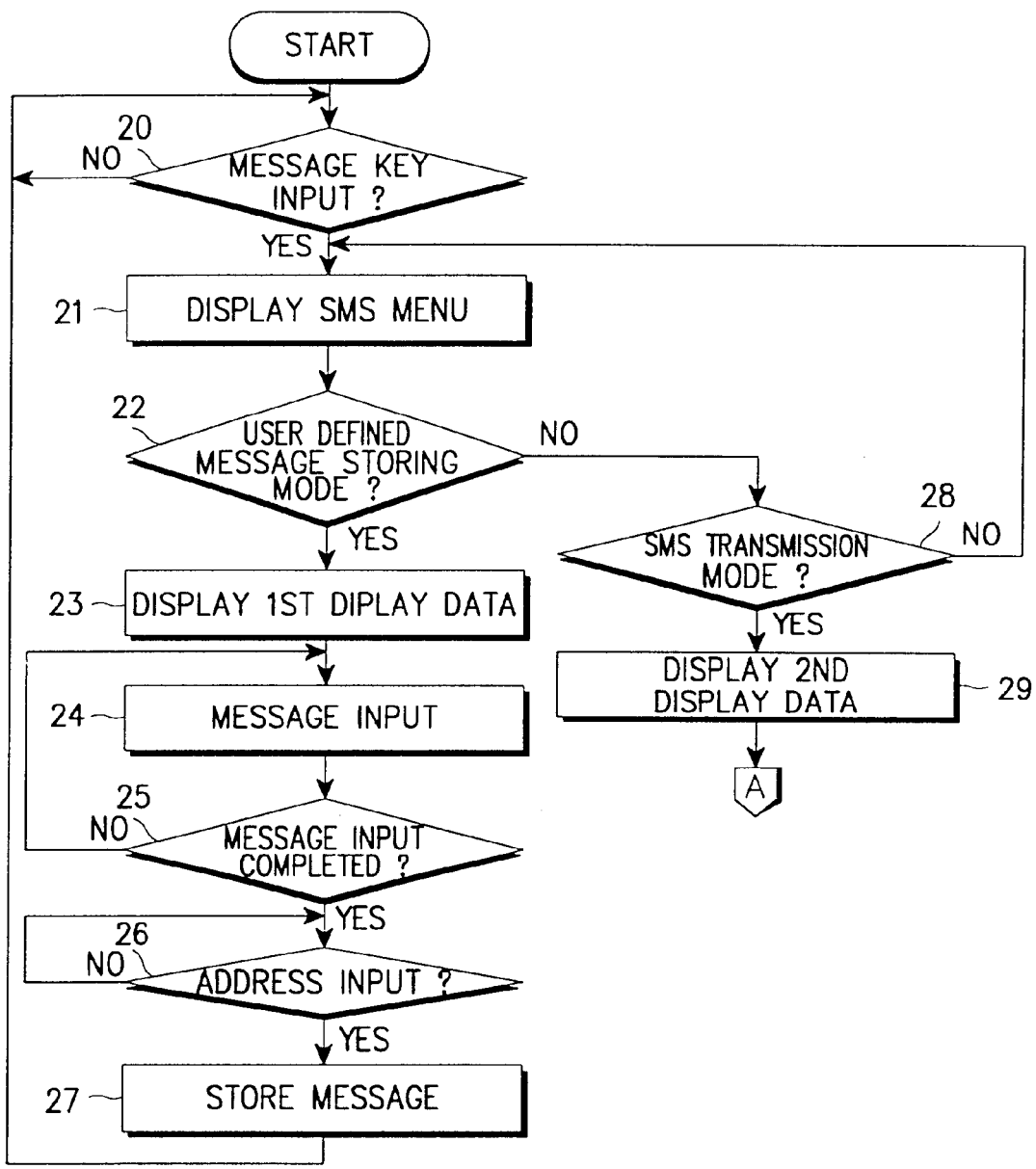
FIGS. 2A and 2B are flow charts illustrating the procedure of transmitting a short message according to an embodiment of the present invention.
Figure 2B:
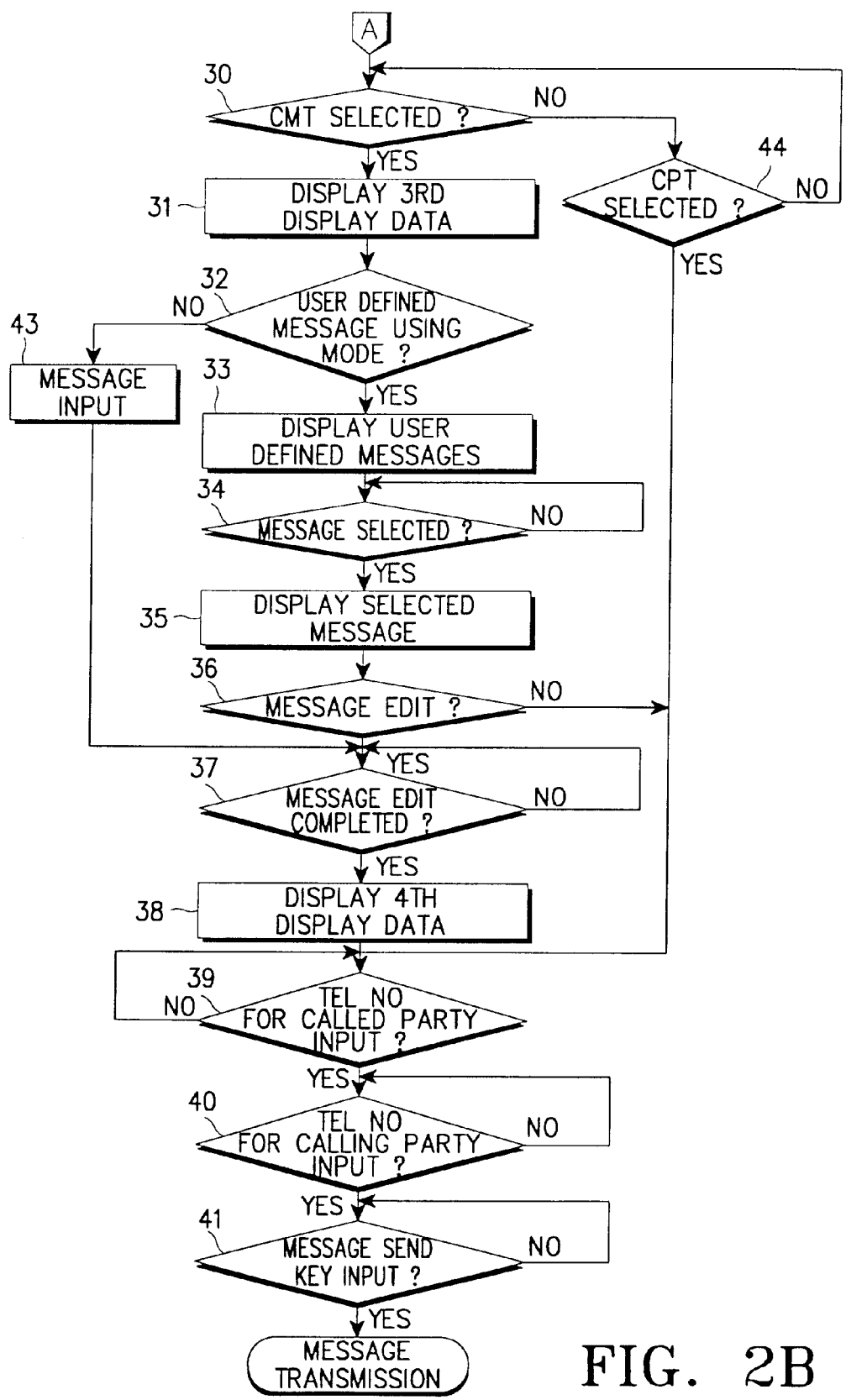

FIGS. 2A and 2B are flow charts illustrating the procedure of transmitting a short message in a digital mobile communication terminal according to an embodiment of the present invention. As illustrated, the procedure includes the steps of storing user predefined messages, reading and editing the stored user predefined message, and transmitting the edited message.

Referring to FIGS. 1 to 2B, the preferred embodiment of the present invention will be described in detail hereinafter. First, to store the user predefined messages, the user will manipulate a message key on keypad 12 which is designated for entering the SMS mode. The controller 10 detects the message key input in step 20 and displays an SMS menu on the display 13 in step 21. Here, the SMS menu may include a mode for storing the user predefined messages and a mode for transmitting the short message (SMS mode). The SMS menu assists the user in choosing the available modes. With guidance from the SMS menu, the user will manipulate a mode select key for selecting the mode for storing the user predefined message.

When the user predefined message storing mode is selected in step 22, the controller 10 displays first display data on the display 13 in step 23. The first display data may be data notifying the user to input the user predefined message that he desires to store. After reviewing the first display data, the user will input the user predefined message by manipulating the character keys of keypad 12. The controller 10 then receives the desired user predefined message (step 24) until a signal representing completion of the message input is entered by the user in step 25. Here, the signal representing the completion of the message input may be generated by depression of a specified key. Thereafter, if a storage address is input in step 26, the controller 10 stores the user predefined message in the storage address in step 27.

If in step 22 the user does not choose the message storage mode but chooses the SMS transmission mode, the controller 10 senses that the SMS transmission mode is selected (step 28) and displays second display data on the display 13 in step 29. Here, the second display data may be data notifying the user to choose between the CMT function and the CPT function. Then, the user will choose one of the CMT and CPT functions by manipulating the keys in response to the second display data. If the user chooses the CMT function in step 30, the controller 10 displays third display data on the display 13 in step 31. Here, the third display data may be data notifying the user to decide whether to use the user predefined message or not in inputting the short message to be transmitted. If the user decides to use a user predefined message in step 32, the controller 10 displays a menu consisting of the user predefined messages on the display 13 in step 33. The user then manipulates a select key to choose one of the user predefined messages which is the most similar to the short message that he desires to transmit. Upon sensing the selection of the user predefined message in step 34, the controller 10 displays the selected user predefined message on the display 13 in step 35.

After the selected user predefined message is displayed, the user will edit, if necessary, the user predefined message through key manipulation in step 36. However, if in step 32 the user decides not to use the user predefined message but input a new message by himself, the controller 10 receives the message that the user inputs by manipulating the keys and displays the input message on the display 13 in step 43. On receiving a signal representing completion of the message edit or the message input in step 37, the controller 10 displays fourth display data on the display 13 in step 38. Here, the fourth display data may be the edited message or new input message as well as data prompting the user to input the telephone numbers for the called party and the calling party. In compliance with the fourth display data, the user will input the telephone numbers for the called party and the calling party and then activate a send key, i.e. generate a message transmission command, for transmitting the short message.

The controller 10 receives the telephone number for the called party to which the short message is to be transmitted in step 39 and the telephone number for the calling party in step 40, and transmits the short message to the called party upon receipt of the send key input in step 41. However, if the user inputs the telephone numbers without editing the message in step 36, the controller 10 jumps to step 39. In addition, if the user does not choose the CMT function in step 30 but instead chooses the CPT function in step 44, the controller 10 also jumps to step 39. According to another embodiment of the present invention, the message input in step 43 may be also stored as another user predefined message.

As described above, the digital mobile communication terminal of the present invention stores user predefined messages that the user frequently uses and transmits the short message by choosing and editing one of the stored user predefined messages which is closest to the message to be transmitted. Accordingly, the user can input short messages easily and save time in generating a suitable generating a short message.

While the present invention has been described in detail with reference to the specific embodiment of the present invention, it is a mere exemplary application. Thus, it is to be clearly understood that many variations can be made by anyone skilled in the art within the scope and spirit of the present invention.

What is claimed is:

1. A method for transmitting a short message in a digital mobile communication terminal having a memory in which user predefined messages are stored in specified addresses, comprising the steps of:

determining whether a short message transmission mode is set through user interface means;

determining whether a user predefined message using mode is set, upon sensing that the short message transmission mode is set;

upon receiving a signal representing a mode for storing the user predefined message, displaying first display data notifying a user to input said user predefined message;

storing in said memory the user predefined message that the user inputs in reply to said first display data;

reading the user predefined messages from said memory and displaying the read user predefined messages, upon sensing that the user predefined message using mode is set;

displaying one of said user predefined messages selected through said user interface means;

displaying second display data notifying the user to select one of said user predefined messages stored in said memory; and reading the user predefined message selected by the user and editing the read user predefined message to a short message to be transmitted determining whether a telephone number for a called party is input through the user interface means;

determining whether a message transmission command is input through the user interface means; and upon receipt of said message transmission command, transmitting said edited message to the telephone number for the called party.

2. The method as claimed in claim 1, wherein after said displaying step, the method comprises the further step of editing said selected user predefined message according to edit data or input data received from said user interface means.

3. The method as claimed in claim 2, wherein said method further comprises the step of:

determining whether a telephone number for a calling party is input through the user interface means, when the telephone number for the called party is input.

4. A method for transmitting a short message in a digital mobile communication terminal having a memory, comprising the steps of:
- upon receiving a signal representing a mode for storing the user predefined message, displaying first display data notifying a user to input said user predefined message;
- storing in said memory the user predefined message that the user inputs in reply to said first display data;
- reading one of said user predefined messages from said memory;
- editing said read user predefined message, comprising the steps of:
  - displaying second display data notifying the user to select one of said user predefined messages stored in said memory; and
  - reading the user predefined message selected by the user and editing the read user predefined message to a short message to be transmitted;
  - entering a telephone number for a called party;
  - entering a message transmission command; and
  - transmitting said edited message.

5. A digital mobile communication terminal for transmitting a short message comprising:
- upon receiving a signal representing a mode for storing the user predefined message, displaying first display data notifying a user to input said user predefined message;
- means for storing in a memory the user predefined message that the user inputs in reply to said first display data;
- means for accessing said stored predefined messages;
- means for editing said accessed predefined message, comprising:
  - means for displaying second display data notifying the user to select one of said user predefined messages stored in said memory; and
  - means for reading the user predefined message selected by the user and editing the read user predefined message to a short message to be transmitted;
  - means for entering a telephone number for a called party;
  - means for entering a message transmission command; and
  - means for transmitting said edited message.

6. A digital mobile communication terminal as claimed in claim 5, further comprising means for displaying said predefined messages.

7. A digital mobile communication terminal as claimed in claim 6, wherein said means for storing includes memory operatively coupled to a controller.

8. A digital mobile communication terminal as claimed in claim 7, wherein said means for editing includes a keypad having a plurality of keys and being operatively coupled to said controller.

9. A digital mobile communication terminal as claimed in claim 8, wherein said means for displaying includes a liquid crystal display operatively coupled to said controller.

* * * * *

UNITED STATES PATENT AND TRADEMARK OFFICE
CERTIFICATE OF CORRECTION

PATENT NO. : 6,590,887 B1
DATED : July 8, 2003
INVENTOR(S) : Lee, Hye-Young

It is certified that error appears in the above-identified patent and that said Letters Patent is hereby corrected as shown below:

<u>Column 5,</u>
Line 27, insert -- means for -- between "message," and "displaying" thereof.

Signed and Sealed this

Fifth Day of July, 2005

JON W. DUDAS
*Director of the United States Patent and Trademark Office*